V. A. CEDERBORG.
REEL.
APPLICATION FILED DEC. 4, 1915.
1,216,255.
Patented Feb. 13, 1917.
2 SHEETS—SHEET 1.
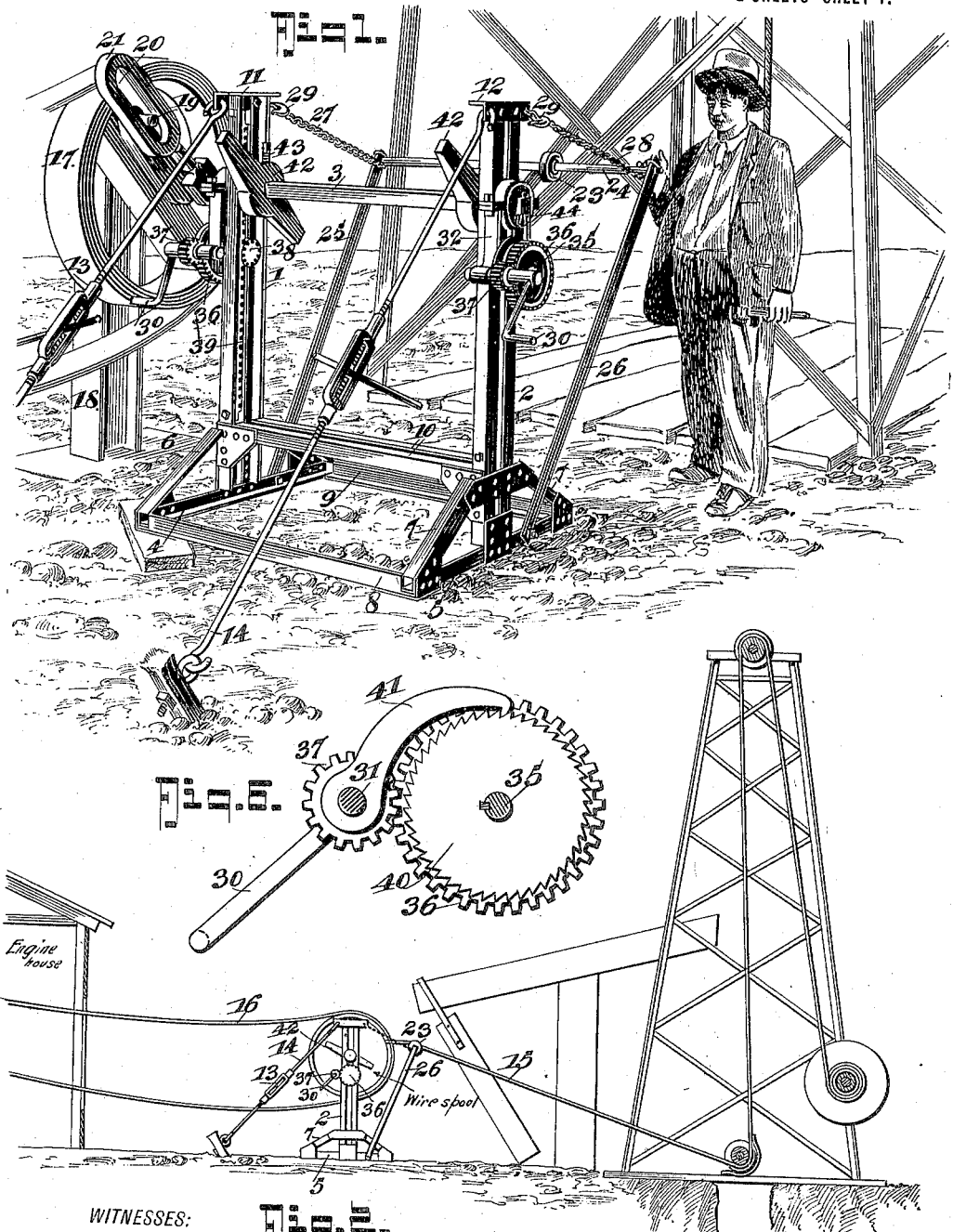
WITNESSES:
John B. Schrott
H. E. Beck
INVENTOR
Victor A. Cederborg.
BY Munn & Co
ATTORNEYS

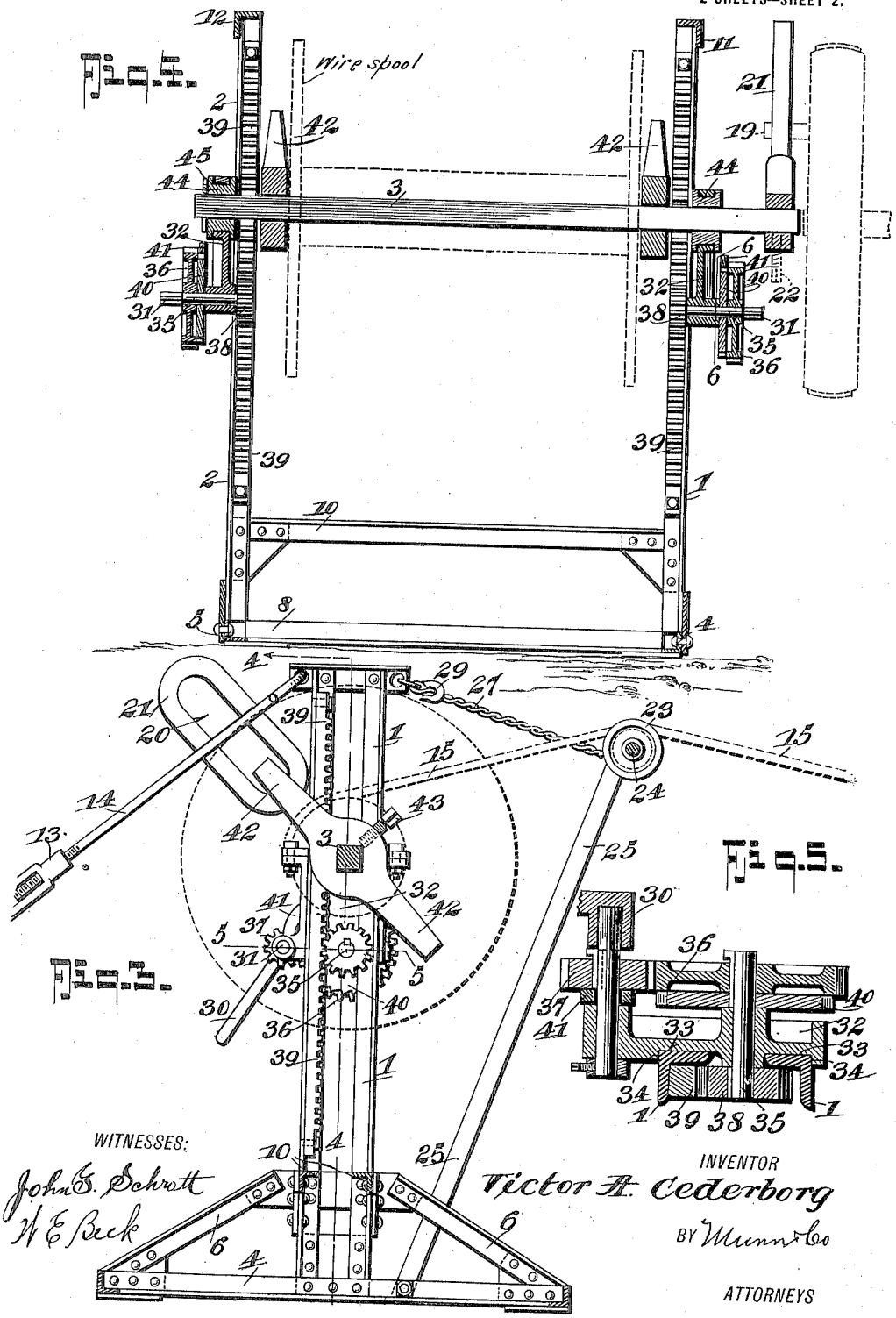

UNITED STATES PATENT OFFICE.

VICTOR ADELNOR CEDERBORG, OF DRUMRIGHT, OKLAHOMA.

REEL.

1,216,255.  Specification of Letters Patent.  Patented Feb. 13, 1917.

Application filed December 4, 1915. Serial No. 65,015.

*To all whom it may concern:*

Be it known that I, VICTOR A. CEDERBORG, a citizen of the United States, and a resident of Drumright, in the county of Creek and State of Oklahoma, have invented a certain new and useful Improvement in Reels, of which the following is a specification.

My invention relates to reels for spooling cables, rope, etc., and consists in the arrangements, constructions, and combination of parts hereinafter described and claimed.

The principal object of my invention is to provide a reel adapted primarily to taking off drilling cables from oil wells and the reel is used when it is desired to either remove the cable as stated or when it is desired to change the ends of the cable. The cable may be rewound on the spool on which it originally was wound when sent from the factory.

Another object of the invention is to provide a spool leveling device which may be manipulated to adjust the spool on an even plane. This leveling device is duplicated and when operated in unison, serves the purpose of elevating the spool.

A further object of the invention is to provide a means for rotating the spool by the engine of the oil well rigging.

The invention is illustrated in the accompanying drawings in which—

Figure 1 is a perspective view of the reel and its coöperating parts.

Fig. 2 is a diagrammatic view illustrating the application of the reel in the operation of removing a drilling cable from an oil well.

Fig. 3 is a cross section through the reel, a cable spool being shown in place, in dotted lines.

Fig. 4 is a section on line 4—4 on Fig. 3.
Fig. 5 is a section on line 5—5 on Fig. 3.
Fig. 6 is a section on line 6—6 on Fig. 4.

The reel consists essentially of vertical supports 1 and 2, each of which is composed of pair of L beams arranged in a spaced relationship so as to leave a vertically disposed opening. The spool rod 3 is disposed laterally of the reel and the ends of the rod 3 extend through the openings between the bars of the supports 1 and 2 as shown in Fig. 4 for a purpose to be explained.

The lower end of each support 1 and 2 is provided with an angle iron pedestal which consists of the ground bars 4 and 5 to each of which the obliquely disposed brace members 6 and 7 are secured. The supports 1 and 2 are spaced a certain distance apart by the lateral angle irons 8 and 9 which also rest on the ground. Other angle irons 10 shown in Fig. 1 extend between the supports 1 and 2 and complete the base or pedestal of the supports. The opening between the pairs of beams of the supports 1 and 2 is preserved by a cap plate 11 and 12 at the top of each. Each cap plate has a hole at both ends.

When the reel is set up for use as in connection with an oil well as in Figs. 1 and 2, the ends of turn-buckle rods 13 and 14 are inserted in one of the pair of holes in each cap plate 11 and 12. The other end of each turn buckle rod is then firmly secured as shown and the turn buckle screwed up until the reel is rigidly braced.

A spool is mounted on the spool rod 3 and one end of the cable 15 is fastened to the spool. The spool rod 3 and spool are then rotated by the belt 16 which passes from the engine house to the pulley 17 which is mounted on a stub shaft this stub shaft being mounted on a pedestal 18 in which it may be adjusted vertically. The pulley 17, which normally operates the walking beam shown in Fig. 2, has a crank pin 19 which engages the slot 20 of an arm 21, which is mounted on the adjacent end of the spool rod 3 as shown in Fig. 4 the arm being clamped in place by a set screw 22. As the pulley 17 rotates, the spool rod 3 is also caused to rotate by the connections just described and thus the cable 15 is caused to be wound on the spool.

The cable 15 is guided by a guide pulley 23 which is mounted on a cross rod 24 the rod 24 being mounted at each end in the upper portion of arms 25 and 26. The lower ends of the arms are fulcrumed on the ground bars 4 and 5 as shown in Fig. 1; the bars may be moved on their fulcrums to accommodate the angle at which the cable 15 is entering the spool. The guide pulley frame is held to such positions by the adjustable chains 27 and 28 which pass through the opposite holes in the cap plates 11 and 12 the chains being held by the hooks 29 as shown.

The spool rod 3 is raised or lowered as conditions may require by turning the removable crank handles 30. The raising and lowering mechanism is duplicated at each side of the machine as shown and the description of one mechanism will suffice for both. Reference to Fig. 5 will show that the crank handle 30 is placed on the squared end of the shaft 31 which is mounted in the bearing plate 32.

The bearing plate 32 is constructed with a depressed surface as at 33 which in consequence forms shoulders 34 at each side which engage the edges of the L beams of the side supports and prevent the bearing plate from turning as it is moved up and down. The bearing plate supports another shaft 35, on one end of which a gear 36 is keyed. A pinion 37 meshes with the gear 36 and causes the latter to revolve when the crank 30 is turned.

A gear 38 is keyed on the other end of the shaft 35 and it engages a rack 39 which is secured to one of the L beams as shown in Fig. 3. A ratchet 40 is located on the shaft 35 adjacent the gear 36 the ratchet being held to the various positions by a pawl 41 as shown in Fig. 6.

When the spool is filled and it is desired to lower it to the ground, the pawl 41 is released from the ratchet 40. The weight of the filled spool forces the bearing plates 32 downwardly and thus causes the gear 38 to rotate over the rack 39. The operators apply resistance to the cranks 30 and prevent the spool from coming down suddenly.

The spool is engaged at each end by tail nuts 42 which are located on the square spool rod 3. They are adjusted to the width of the spool and clamped into position by the set screws 43 as shown in Fig. 4.

The spool rod is mounted in the bearing plates 32, as shown in Fig. 4, by which it will also be seen that the rod passes through a collar 44 at each end the collars being in turn mounted in semi-circular bearings in the plates 32 to which the collars are held by suitable bearing caps. A cotter pin 45 prevents the spool rod from slipping out of the collars 44, in one direction.

Having thus described the construction of the device, the operation thereof is as follows:—A spool is placed on the spool rod 3, this being accomplished by first withdrawing the spool rod and then running it through the central opening in the spool. The spool is held in place by the tail nuts 42 which are forced tightly against the heads of the spool and then clamped in place.

The spool is then elevated to the desired height by turning the cranks 30, and the operation of removing the cable or winding one thereon if the spool happens to be an empty one, proceeds as has been described.

The pulley 17 is adjusted to the same axial height as the rod 3 occupies so that the rod may be revolved by the pulley 17. Since the elevating devices are separate units they can be operated independently of each other and thus serve the purpose of leveling the spool rod should it be found not to be level. This is accomplished, of course, by turning one or the other of the cranks 30 until the low side has been properly raised. The pawl and ratchet holding devices make adjustments of one fourth of an inch possible.

This machine is a convenient spooling device for any kind of heavy wire, cable, Manila rope or electric current conductor, and because of its comparatively light weight can be easily moved from place to place. It has been found that a seven-eighths inch wire cable three thousand feet long could be taken from the drilling rigging of an oil well in eight minutes whereas the present and laborious method of spooling the cable by hand requires several hours. The spool rod 3 may be operated by a crank when engine power is not available.

I claim:—

1. In a reel, a frame formed of a pair of standards each standard being composed of a pair of angle irons spaced apart to leave an opening, a bearing plate coöperating with each standard, a spool rod extending transversely of the frame and being supported at its ends by the bearing plates, said ends projecting through the aforesaid openings, gear and rack devices coöperative with the bearing plate and standard for elevating the bearing plate, pawl and ratchet devices associated with the bearing plate for holding the bearing plate to its degree of elevation, tail nuts on the spool rod for engaging the spool and a crank arm on the spool rod for turning the rod.

2. In a reel, a frame composed of end standards having pedestals at the bottom, each of said pedestals being composed of ground bars and braces, ground beams between the pedestals adapted to hold the standards in spaced relationship, brace bars between the standards near the bottom, each of the aforesaid standards being composed of a pair of spaced angle irons, cap plates at the top of each standard, guide bars fulcrumed on each of the ground bars of the pedestals, a rod disposed between the upper ends of the guide bars, a threader roller mounted on the rod, chains between the guide bars and the cap plates, and a spool rod adjustably and rotatably mounted on the frame.

3. In a reel, a frame formed of a pair of standards each standard being composed of a pair of angle irons spaced apart to leave a vertical opening, a bearing plate slidably engaged with each standard and mounted on the outside thereof, a spool rod disposed transversely of the frame and having its ends supported in the bearing plates, said ends projecting through the adjacent opening in the adjacent standard, a rack mounted on each standard, a gear on each bearing plate coöperating with the rack, said gear devices being independently operatable, and pawl and ratchet devices on each bearing plate for holding the gear to its position with relationship to its coöperating rack.

4. In a reel, the combination with the standard consisting of a pair of vertically disposed angle irons, said irons being spaced apart to leave an opening; a rack mounted on one of the angle irons, a bearing plate slidably mounted on the standard, a spool rod supported at one end by the bearing plate the end of the spool rod being projected through the opening between the angle irons, a gear on the bearing plate in engagement with the rack, pinion and gear devices for rotating the aforesaid rack engaging gear, a crank for turning the pinion, and pawl and ratchet devices associated with the pinion and gear supports for holding them at different positions.

5. In a reel, the combination with the standard having opposed angle irons spaced apart to leave an opening; a bearing plate slidably mounted on a part of the exterior surface of the opposed angle irons, a shaft mounted in the bearing plate, one end thereof extending through the opening to the interior of the opposed angle irons, a gear mounted in the aforesaid end of the shaft, a rack mounted on one of the adjacent angle irons for coöperation with the gear, another gear mounted on the opposite end of the shaft, a second shaft mounted in the bearing plate, said shaft having a squared end, a pinion on the shaft being in mesh with the adjacent gear on the aforesaid shaft, a ratchet mounted on one of the shafts, and a coöperating pawl mounted on the opposing shaft.

6. In a reel, in combination with the standard having angle irons in opposed disposition; a bearing plate slidably mounted on the exterior surface of the standard, said plate having a depressed seat in which the standard is disposed, bearing hubs on the bearing plate, each of said hubs supporting shafts, a gear on one shaft coöperating with a rack on an adjacent angle iron on the standard, a gear on the opposite end of the shaft meshing with a pinion on the opposing shaft, a crank for turning the last named shaft so as to elevate the bearing plate and pawl, and ratchet devices between the shafts to hold them to their positions.

VICTOR ADELNOR CEDERBORG.

Copies of this patent may be obtained for five cents each, by addressing the "Commissioner of Patents, Washington, D. C."